United States Patent [19]

Herzl et al.

[11] 4,445,388

[45] May 1, 1984

[54] DUAL-BODY VORTEX-SHEDDING FLOWMETER

[75] Inventors: Peter J. Herzl, Morrisville; Warren O. Strohmeier, Warminster, both of Pa.

[73] Assignee: Fischer & Porter Company, Warminster, Pa.

[21] Appl. No.: 392,669

[22] Filed: Jun. 28, 1982

[51] Int. Cl.³ .............................................. G01F 1/32
[52] U.S. Cl. ................................................. 73/861.24
[58] Field of Search ......................... 73/861.22, 861.24

[56] References Cited

U.S. PATENT DOCUMENTS

| | | | |
|---|---|---|---|
| 3,116,639 | 1/1964 | Bird | 73/861.24 |
| 3,888,120 | 6/1975 | Burgess | 73/861.24 |
| 4,033,188 | 7/1977 | Herzl | 73/861.24 |
| 4,033,189 | 7/1977 | Herzl et al. | 73/861.24 |
| 4,226,117 | 10/1980 | Herzl | 73/861.22 |
| 4,262,544 | 4/1981 | Herzl | 73/861.24 |

Primary Examiner—Herbert Goldstein
Attorney, Agent, or Firm—Michael Ebert

[57] ABSTRACT

A vortex-shedding flowmeter for accurately measuring the flow rate of gases and liquid conducted through a flow tube provided with a dual-body shedder having a front section fixedly mounted across the tube, behind which is a pivotally mounted rear section separated from the front section by a gap configured to produce a fluidic feedback path so that a strong hydraulic interaction takes place between the sections and both actively contribute to the formation of periodic vortices which are alternately shed on either side of the shedder. The rear section is mounted on a pivot shaft extending along an axis normal to the flow axis of the tube, whereby the vortices which appear on either side of the rear section induce the rear section to oscillate. These oscillations are sensed to produce a signal representing the flow rate.

9 Claims, 4 Drawing Figures

$R \simeq .50D$ $W_1 \simeq .26D$ $T \simeq .10D$ $S \simeq .05D$ $W_2 \simeq .33D$ $L_1 \simeq .39D$ $L_2 \simeq .016D$

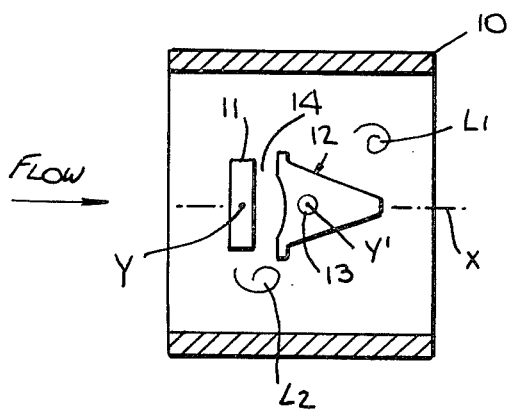
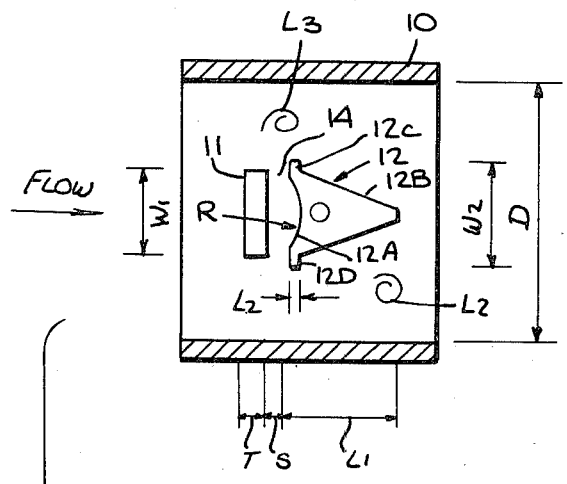
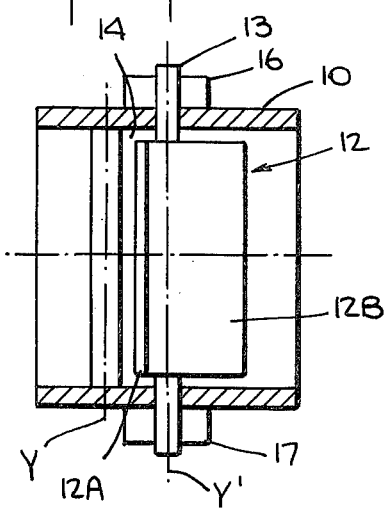
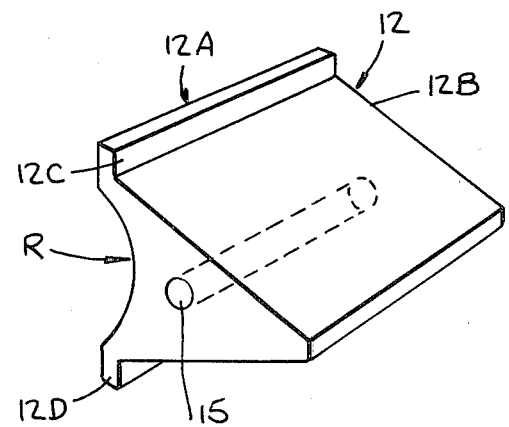

DUAL-BODY VORTEX-SHEDDING FLOWMETER

BACKGROUND OF INVENTION

This invention relates generally to vortex-shedding flowmeters adapted to measure flow rate, and more particularly to a meter capable of accurately measuring the flow rate of gases as well as liquids, the meter including a dual-body vortex shedder.

It is well known that under certain circumstances the presence of an obstacle or shedder in a flow pipe will give rise to periodic vortices. For small Reynolds numbers, the downstream wake is laminar in nature, but at increasing Reynolds numbers, regular vortex patterns are formed which are known as Karman vortex streets. The frequency at which these vortices are shed is a function of flow rate.

This phenomenon is exploited to create a flowmeter for measuring the volumetric flow of fluids being treated or supplied in order to carry out various control functions. Flowmeters operating on this principle are disclosed in the Bird patent 3,116,639, and in the White patent 3,650,152. Flowmeters of the vortex-shedding type, such as those disclosed in the Burgess patent 3,888,120 and the Herzl patent 4,162,238, are capable of effecting accurate volumetric or mass flow measurement.

The Herzl patent 4,181,020 discloses a vortex-type flowmeter in which fluidic oscillations produced by a shedder mounted in a flow pipe are sensed by a downstream balanced-vane sensor pivoted in a torsional suspension that allows only microscopic vane motion. The shedder acts to divide the incoming fluid flowing therethrough and causes vortices to be shed alternately on either side thereof. The downstream train of vortices passing on either side of the vane sensor generates fluidic forces giving rise to alternate clockwise and counterclockwise torques, causing the sensor to oscillate mechanically at a frequency proportional to the flow rate of the fluid being metered.

The Herzl patent 4,226,117 discloses a vortex-shedding flowmeter wherein torsionally-supported behind the shedder is a drag-actuated sensor which includes a pair of parallel legs symmetrically disposed with respect to the longitudinal axis of the flow pipe.

With a drag-actuated sensor, as vortices are successively detached from the shedder and appear alternately on either side of the gap between the shedder and the downstream sensor, the low pressure region generated by each vortex acts to displace the stagnant zone produced in this gap as a result of fluid flow past the shedder to a position in front of the adjacent leg of the sensor, the fluid flow then going around and past the other leg, thereby developing a torque about the pivot axis. These torques are developed alternately, causing the torsionally-supported sensor to oscillate at a frequency in accordance with flow rate.

In both the Herzl patents 4,181,020 and 4,226,117, motion of the torsionally-supported sensor is detected by means of a transducer which takes the form of a strain gauge bonded to a resilient beam, one end of which is attached to the trunnion or shaft of the sensor projecting through the flow pipe, the other end being anchored. The resultant deformation of the beam as the shaft oscillates is translated by the strain gauge into a corresponding electrical signal whose frequency is indicative of flow rate. As pointed out in these Herzl patents, an important advantage of a vortex flowmeter having a torsionally-mounted sensor is that the meter is effective and accurate for both liquid and gas flow measurements.

The drag-actuated sensor arrangement disclosed in Herzl patent 4,226,117 closely approaches the ideal requirements for a sensing system in a vortex-type flowmeter. These ideals are as follows:

A. The system has a sensitivity which renders the meter effective for low-pressure gas measurement.

B. The system is one which has an inherent ruggedness that renders the meter suitable for heavy-duty liquid flow rate measurement.

C. The system is insensitive to mechanical shock and acceleration forces to which the flowmeter is subjected.

D. The system is capable of operating over the broad temperature range normally encountered in gas and liquid measurement and is capable of operating over a very wide operating frequency range.

E. The sensing system requires virtually no motion and is not limited by torque transducer bonding or attachment problems.

F. Finally, the sensing system is one which is relatively inexpensive and has a compact structure.

Flowmeters of the type disclosed in Herzl patent 4,266,117 operate reliably and efficiently in relatively large meter sizes for measuring the flow rate of gases or fluids. But in smaller sizes, as with meters having an internal diameter of two or three inches, the fluidic forces which act on the torsionally mounted, drag-actuated sensor are relatively weak, with a resultant low output signal that is difficult to distinguish from noise signals.

Moreover, with a small vortex meter of the drag-actuated type whose operation depends on a slot in the rear body, this slot will necessarily be relatively narrow in a small meter and therefore subject to blockage by contaminants carried by the fluid being metered.

SUMMARY OF INVENTION

In view of the foregoing, the main object of this invention is to provide a vortex meter which accurately measures the flow rate of a gas or liquid passing through the flow tube even in a meter of small diameter.

More particularly an object of this invention is to provide a meter of the above type in which the shedder is a dual-body structure whose front section is separated from a rear section by a small gap, so that a strong hydraulic interaction takes place between the sections and both actively contribute to the formation of vortices.

Also an object of the invention is to provide a dual-body vortex-shedding meter which is substantially linear over a broad range and which produces significantly better results than single body shedders.

Briefly stated, these objects are attained in a vortex-shedding flowmeter for accurately measuring the flow rate of gases and liquids conducted through a flow tube provided with a dual-body shedder having a front section fixedly mounted across the tube, behind which is a pivotally mounted rear section separated from the front section by a gap configured to produce a fluidic feedback path so that a strong hydraulic interaction takes place between the sections and both actively contribute to the formation of periodic vortices which are alternately shed on either side of the shedder.

The rear section is mounted on a pivot shaft extending along an axis normal to the flow axis of the tube, whereby the vortices which appear on either side of the rear section induce the rear section to oscillate. These oscillations are sensed to produce a signal representing the flow rate.

OUTLINE OF DRAWINGS

For a better understanding of the invention as well as other objects and further features thereof, reference is made to the following detailed description to be read in conjunction with the accompanying drawings, wherein:

FIG. 1 is a longitudinal section taken in the vertical plane illustrating a dual-body vortex-shedding flowmeter in accordance with the invention;

FIG. 2 sets out the relative parameters of the components of the flowmeter;

FIG. 3 is a longitudinal section taken in the horizontal plane of the flowmeter; and FIG. 4 is a perspective view of the rear section of the dual-body shedder included in the meter.

DESCRIPTION OF INVENTION

The Structure

Referring now to the figures of the drawing, there is shown a dual-body vortex-shedding flowmeter in accordance with the invention, the meter including a flow tube 10 whose longitudinal flow axis is indicated by axis X. Tube 10 has a circular cross section and a relatively small internal diameter, such as two or three inches. While the invention has special advantages in small meter sizes, it is usable in large sizes.

Disposed within flow tube 10 symmetrically with respect to flow axis X is a dual-body shedder composed of a front section 11 and a rear section 12. Front section 11 is in the form of a bar having a rectangular cross section which is fixedly mounted across the tube to intercept the incoming fluid stream. The long axis Y of bar 11 intersects and is perpendicular to flow axis X.

Rear section 12 is pivotally supported behind front section 11 by means of a shaft 13 whose ends extend through sealed bores in opposite sides of flow tube 10. Rear section 12 is constituted by a leading segment 12A whose front face has a transverse trough or scoop having a radius R. Extending behind leading segment 12A is a tail segment 12B having a triangular cross section. The leading segment 12A is somewhat broader than the base of the tail segment to define upper and lower shoulders 12C and 12D at the junction of the segments.

The front face of leading segment 12A of rear section 12 is parallel to the rear face of front section 11, the space therebetween defining a narrow gap 14.

Tail segment 12B is provided with a transverse bore 15, as shown in FIG. 4, which is adjacent the leading segment and accommodates pivot shaft 13 whose longitudinal axis Y' is parallel to long axis Y of the front section and is normal to flow axis X.

The respective ends of shaft 13 which extend outside of tube 10 are operatively coupled to torsion sensors 16 and 17, as shown schematically in FIG. 3. These may be of the type disclosed in Herzl patent 4,262,544, wherein each torque transducer coupled to a shaft extension is constituted by at least one piezoelectric crystal interposed between one side of the shaft extension and a stationary preloading block. The arrangement is such that as the shaft extension oscillates, it subjects the crystal element to alternate compression and decompression to generate an alternating voltage providing an output signal whose frequency is proportional to flow rate. The movement of the shaft extension is restricted by the pre-loaded crystal element to a degree whereby the extension is virtually motionless. Any of the torque sensors disclosed in the above-identified Herzl patents may be used in conjunction with the shaft to restrict oscillatory movement thereof and to produce a signal representing flow rate.

Operation

In operation, the incoming fluid stream to be metered is divided by the dual-body shedder 11-12 into two streams passing along opposing sides of the shedder to produce periodic vortices alternately on one side and then on the other side at a repetition rate proportional to the flow rate. For convenience, these opposing sides will be referred to hereinafter as upper and lower sides.

In FIG. 1, fluid approaching front section 11 forms a first vortex which passes downstream, this vortex $L_1$ 1 being shown adjacent the upper side of the rear section 12 at a position close to the apex of the triangular tail segment. Because a vortex creates a low pressure region, vortex $L_1$ tends to pull the pivoted rear section 12 toward this low pressure region, thereby creating a counterclockwise torque about pivot axis Y'.

In FIG. 1, a second vortex $L_2$ is formed at the lower side of front section 11 of the shedder, vortex $L_2$ being shown adjacent gap 14 at a time when the previously produced vortex $L_1$ is near the apex of the rear section tail. In FIG. 2, vortex $L_2$ has advanced to a position adjacent the apex of the rear section tail, whereas a new vortex $L_3$ is developing at the upper side of the shedder. The low pressure region created by vortex $L_2$ tends to pull the pivoted rear section 12 toward this low pressure region, thereby creating a clockwise torque about front pivot axis Y'.

Since vortices are alternately generated in this manner, the rear section 12 is caused to oscillate at a rate in accordance with the periodicity of the vortices, this rate being proportional to the flow rate of the fluid being metered.

Because these vortices create low pressure regions at displaced positions on opposite sides of the dual-body shedder, a hydraulic feedback path is created around rear section 12. This feedback path which passes through gap 14 causes the shedding to alternate in a regular pattern from one side of the shedder to the other.

It is the function of rear section 12 to maintain this feedback action as uniform as possible under all flow conditions or at all Reynolds numbers. The configuration of rear section 12 and the proportions of gap 14 are used to tune this feedback path. By proper adjustment of gap 14, the meter may be linearized over a broad Reynolds number range. A second factor having a significant influence on meter linearity is the size of shoulders 12C and 12D at the leading edge of rear section 12.

The transverse trough in the front face of leading segment 12A has an arcuate cross section whose radius is represented by letter R. This trough or scoop acts to channel flow around the rear of the front shedder section 11 through gap 14 to provide a fluidic feedback passage of stable length functioning to bring about commutation of the vortices on the front section 11 from one side to the other. Thus in operation, a passing vortex creates a low pressure region which seeks to pull flow in the passage toward itself, and as this flow is established shedding is arrested and shedding on the opposite side of the front section is commenced. This action greatly strengthens the natural shedding phenomenon and improves meter linearity at lower Reynolds numbers (near 10,000).

The dimensions given in connection with FIG. 2 are those which in the context of a meter tube having a two-inch internal diameter have been found to provide accurate flow rate readings throughout a broad range. In the Figure, value D represents the internal diameter of the meter, all other values being represented as specified fractions of D.

Thus $W_1$, which is the width of front section 11, is 0.26D; while $W_2$, which is the broadest width of rear section 12, is 0.33D. Thickness T of front section 12 is 0.08D, and the length $L_1$ of rear section 12 is 0.39D. The length $L_2$ of the shoulders 12C and 12D is 0.016D, and the size S of gap 14 is 0.05 D. These are generalized dimensions of a dual-body shedder vortex meter in accordance with the invention and are by no means the only dimensions possible or desirable.

The shedder disclosed herein differs from the drag sensor type meter disclosed in Herzl patent 4,226,117 in several major respects. In the present invention, the rear section controls the feedback pattern in a mechanical way, whereas in the drag sensor arrangement, flow through the slot in the rear body affords an equivalent function hydraulically.

While there has been shown and described a preferred embodiment of a dual-body vortex-shedding flowmeter in accordance with the invention, it will be appreciated that many changes and modifications may be made therein without, however, departing from the essential spirit thereof.

We claim:

1. A vortex-shedding flowmeter for measuring the flow rate of fluids, said flowmeter comprising:
   A. A flow tube through which flows the fluid stream to be metered, said tube having a longitudinal flow axis;
   B. a dual-body shedder disposed in said tube symmetrically with respect to said flow axis, said shedder having a front section fixedly mounted across the tube, the long axis of the front section being normal to the flow axis, and a fluid-impermeable rear section behind the front section and independent thereof to define therewith an obstacle-free gap configured to produce a fluidic feedback path so that a strong hydraulic interaction takes place between the sections, the width of said gap being small relative to the width of the front section, both of which divide the fluid stream and contribute to the formation of periodic vortices which are alternately generated on either side of the dual-body shedder;
   C. a shaft pivotally supporting said rear section on a pivot axis parallel to said long axis and normal to said flow axis, whereby said vortices induce oscillations in the rear section at a frequency depending on flow rate; and
   D. a torsion sensor operatively coupled to the shaft to convert the oscillations into a signal representing the flow rate.

2. A flowmeter as set forth in claim 1, wherein said front section has a rectangular cross section whose faces are at right angles to the flow axis.

3. A flowmeter as set forth in claim 2, wherein said rear section has a leading segment whose front face forms one wall of the gap, the other wall of which is formed by the back face of the front section, and a tail segment extending behind the leading segment.

4. A flowmeter as set forth in claim 3, wherein said front face has a transverse arcuate scoop formed therein to channel flow through the gap to provide a fluidic feedback path of stable length.

5. A flowmeter as set forth in claim 4, wherein said scoop has a radius which is about equal to one half of the internal diameter of the flow tube.

6. A flowmeter as set forth in claim 3, wherein said tail segment has a triangular cross section.

7. A flowmeter as set forth in claim 3, wherein shoulders are formed at the junction of the leading and last segments.

8. A flowmeter as set forth in claim 1, wherein the ends of the shaft extend through bores in said tube and are coupled to torsion sensors.

9. A flowmeter as set forth in claim 1, wherein said torsion sensor restricts the oscillations to microscopic motions.

* * * * *